United States Patent [19]

Gerber

[11] Patent Number: 4,619,499

[45] Date of Patent: Oct. 28, 1986

[54] SLEEVE FOR LARGE CAPACITY LIGHT WAVEGUIDE CABLES

[75] Inventor: Klaus Gerber, Manching, Fed. Rep. of Germany

[73] Assignee: Siemens Aktiengesellschaft, Berlin & Munich, Fed. Rep. of Germany

[21] Appl. No.: 269,871

[22] Filed: Jun. 3, 1981

[30] Foreign Application Priority Data

Jul. 7, 1980 [DE] Fed. Rep. of Germany ..... 30257002

[51] Int. Cl.⁴ .......................... G02B 6/36; G02B 7/26
[52] U.S. Cl. .................................................. 350/96.20
[58] Field of Search ........................... 350/96.20, 96.21

[56]  References Cited
U.S. PATENT DOCUMENTS 4,057,448  11/1977  Miller ................................ 350/96.21
4,171,867  10/1979  Cocito ............................... 350/96.21

FOREIGN PATENT DOCUMENTS 2721300  11/1978  Fed. Rep. of Germany .

Primary Examiner—William L. Sikes
Assistant Examiner—Robert E. Wise
Attorney, Agent, or Firm—Hill, Van Santen, Steadman & Simpson

[57]  ABSTRACT

A sleeve for protecting the splices between waveguide cores or optical fibers, which cores or fibers are received in groups or bundles which in turn are received in a light waveguide cable characterized by a housing having an entrance for each of the cables, said housing containing a plurality of removable plates with a single plate for each group of individual light waveguide cores or fibers, said plates being arranged in the housing in spaced relationship with each of the plates containing a plurality of holding elements for the splices between the light waveguide cores and guide pins for holding the excess lengths of the light waveguide cores in loose loops on the plate. Preferably, the sleeve includes a comb adjacent each of the entrances for spreading the individual bundles or groups of individual light waveguide cores to the spacing between the plates.

4 Claims, 2 Drawing Figures

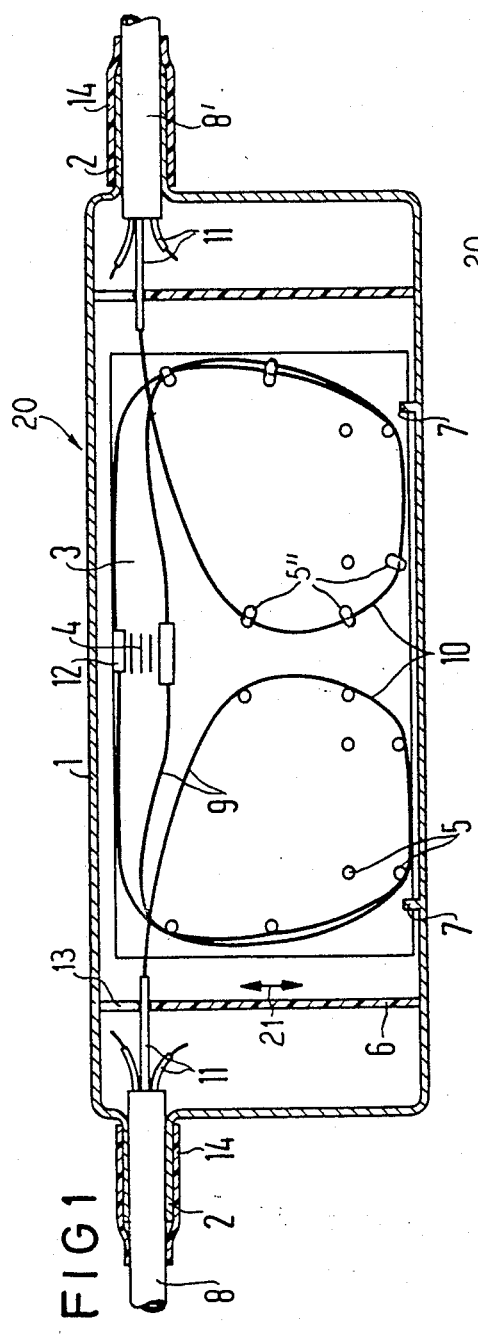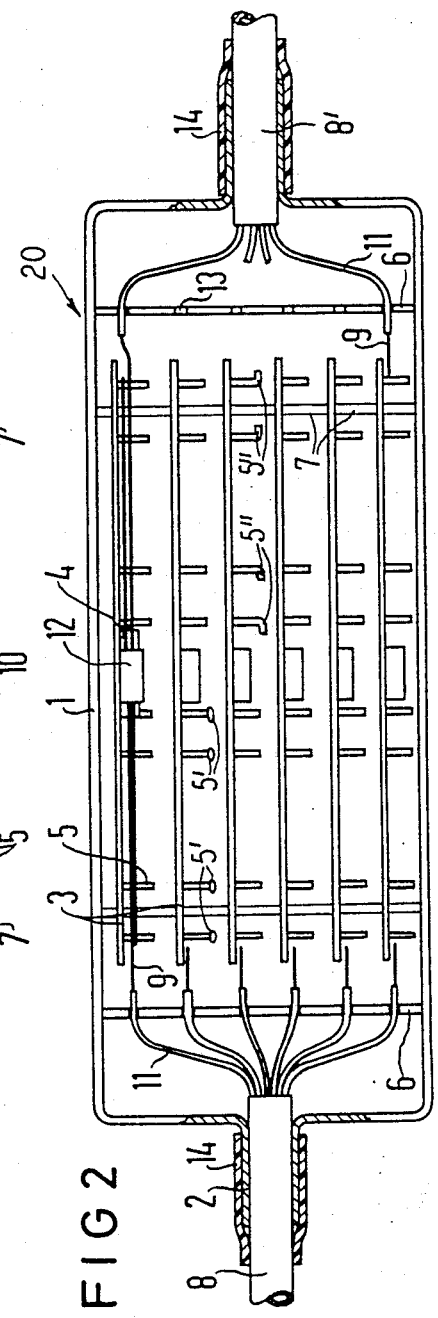

SLEEVE FOR LARGE CAPACITY LIGHT WAVEGUIDE CABLES

BACKGROUND OF THE INVENTION

The present invention is concerned with a cable sleeve for large capacity light waveguide cables which has a housing with a pair of cable entrances for receiving light waveguide cables whose waveguide cores are spliced together in the housing and the housing contains an arrangement for fixing and supporting the excess length of each of the light waveguide cores which are spliced together.

In order to protect the light waveguide cores, which are spliced together, a conventional cable sleeve for electrical cables can be used; however, in the case of a housing for the splices of the light waveguide cores, additional measures are required with respect to fixing and supporting the excess length of each of the individual light waveguide cores. Thus, it is practical to create special devices for the light waveguides with which particular attention is paid to the peculiarities of the light waveguide cores or optical fibers, for example the danger of breakage. To accomplish this, German Pat. No. 2,621,852 describes a device for handling or fixing the excess length of the light waveguide cores in a cable sleeve by providing a means for holding the splicing element and means for supporting the excess length in a loop formation. Since high capacity light waveguide cables contains several bundles or groups of many light waveguide cores or fibers, the carrier plate of the housing of the German patent is no longer able to support all of the cores and still provide the easy inspection and accessability to the individual light waveguide cores or fibers. Thus, problems exist in providing a housing or cable sleeve that provides accessability to the light waveguide cores and also to the light waveguide splices.

SUMMARY OF THE INVENTION

The present invention solves the problem of providing accessability to each of the individual light waveguide cores and the splices of the light waveguide cores for optical cables having a plurality of bundles or groups of individual light waveguide cores or optical fibers.

This problem is solved by an improvement for a sleeve or cable sleeve for light waveguide cables which sleeve has a housing with a pair of cable entrances for receiving the light waveguide cables whose waveguide cores or optical fibers are spliced together in the housing, said housing containing means for fixing the excess length of each of the light waveguide cores being spliced together. The improvement comprises the housing containing a plurality of removeable plates with each plate being associated with a group of individual light waveguide cores of the light waveguide cable, said plates being arranged in said housing in a spaced relationship, each of said plates containing means for holding the light waveguide splices and means for fixing and supporting the excess length of the light waveguide cores being spliced together.

A major advantage of the invention is that each of the waveguide cores or optical fibers, which are being spliced together, have a sufficient excess length which can be arranged in the manner which can be monitored and the individual splices are readily accessible. The ease of inspection is obtained in that each of the individual bundles of the large capacity light waveguide cables is arranged on a separate removeable or slide in plate which can be individually pulled from the housing as needed. For this, the required excess length of each of the light waveguide cores is secured in their position on each of the removable plates by means for fixing and supporting which assures the necessary freedom of motion of the plate because of the excess length of the fibers will enable the removal of the plate when desired. The excess length of the cores is selected so that even subsequent resplicing is also possible.

Preferably the individiual light waveguide bundles of a light waveguide cable are fixed adjacent to the cable entrance of the housing sleeve in a comb-like element which has notches which are spaced apart by an amount corresponding to the spacing between the removeable plates. Each notch or groove receives a single bundle so that the bundles of each cable are fanned out or spread apart with the spacing between the individual bundles corresponding to the spacing between the individual plates in the housing of the sleeve. Thus, an ease of inspection is attainable and the arrangement of the remaining light waveguide bundles is maintained during the removal of one of the removeable plates. The number of removeable plates is selected to be the same as the number of bundles or groups in each cable and the holding elements on each plate, which are arranged as a magazine, are based on the number of individual waveguides or fibers in each bundle or group.

BRIEF DESCRIPTION OF THE DRAWINGS

FIG. 1 is a longitudinal cross-sectional view of a sleeve in accordance with the present invention; and FIG. 2 is a top view with portions broken away for purposes of illustration of the housing of the sleeve with the lid removed therefrom.

DESCRIPTION OF THE PREFERRED EMBODIMENTS

The principles of the present invention are particulary useful in a sleeve generally indicated at 20 in the FIGS. The sleeve 20 has a housing 1, which has a pair of entrances 2 into which are inserted waveguide cables 8 and 8', respectively, so that the individual light waveguide cores or fibers 9 of each of the cables can be joined together by an individual splices 12.

Each of the cables 8 and 8' is sealed in its entrance such as 2 by sealing means which may include a shrinking seal 14 which uses a shrinkable tube which is hot shrunk onto the entrance 2 and the cable 8. Instead of using the heat shrinkable tubes 14, the sealing means can be a pressed plug seal or gasket or a clamped type seal.

As illustrated, once the cable 8 or 8' has been passed through the entrance 2, the outer portion is removed exposing the plurality of individual bundles or groups 11 of individual light waveguide cores or fibers 9 (for purposes of illustration only two cores 9 are illustrated for one bundle or group 11) and each bundle extends to a separate plate 3. After the cable such as 8 enters the entrance 2 of the housing 1, the individual bundles or groups 11 are received in notches 13 of a comb-like element 6 which spaces out and spreads the various bundles 11 to a spacing which corresponds to a spacing between the plates 3 (see FIG. 2). Each of the plates 3 is slidably received in a holding element 7, which holding element 7 fixes the plate in a spaced parallel arrangement in the housing 1 as best illustrated in .2. The holding elements enable the plate 3 to be inserted into the housing 1 and removed therefrom along a direction indicated by the double arrow 21.

Each of the plates 3 has means such as a plurality of holding elements 4 for holding the splices 12 between the individual waveguide cores 9. Preferably the holding elements are arranged on a line one under the other in the manner of a magazine. In addition, each of the plates 3 has a plurality of projections or guide pins 5 which are arranged in a pattern so that the excess length of the waveguide cores 9 can be held in a loop-like arrangement 10 in such a manner that the minimum allowable radius of curvature for the light waveguide cores 9 is not reached. The guide pins 5 can be designed with a broadened or head-like formation as the pins 5′ in FIG. 2 or can have a bent over portion at their ends such as illustrated by the pin 5″ in FIGS. 1 and 2. The purpose of the bent over ends of the pins 5″ or the head like formation of the pins 5′ is to prevent the waveguide core or fiber 9 from slipping off of the arrangement of the pins 5 after the loop 10 has been positioned thereon. Since the holding elements 4 for holding the splices 12 are arranged one under the other a good overview and identification of the individual splices on each plate is possible. Thus, each of the splices 12 between the individual optical fibers or waveguide cores 9 for one bundle 11 from a cable 8 to the individual optical fibers or cores of an associated bundle in the cable 8′ can be easily inspected. Because each of the splices and loops of one group or bundle are assigned to a single plate, the single removeable plate 3 can be easily removed without removing the adjacent plates which hold the other bundles 11 of the cables 8 and 8′. It should be noted that the removal of the plates is accomplished after the cover of the housing 1 has been removed and the cover is a conventional cover with conventional sealing means so that the interior of the housing will be a sealed interior.

As best illustrated in FIG. 2, the holding means 7 for the plate 3 holds the plates in spaced parallel arrangement so that there is no interference between adjacent plates. Due to the cooperation of the comb 6 having the notches or slots 13, the individual bundles 11 have been fanned or spread out and thus do not interfere with each other when extending to the respective plate. The arrangement of the pins or projections 5 enable receiving the loops 10 of the excess waveguide cores 9 while the splice 12 between the two cores is received in the holding elements 4 forming the holding means for the splices 12. Due to the excess material of the loops 10, the individual plates 3 with the splices 12 still remaining on the holding means can be removed for purposes of an inspection of the splices and/or to correct or make new splices without causing or disturbing of adjacent plates in the splices held thereon.

Although various minor modifications may be suggested by those versed in the art, it should be understood that I wish to embody within the scope of the patent granted hereon, all such modifications as reasonably and properly come within the scope of my contribution to the art.

I claim:

1. A sleeve for light waveguide cables having a plurality of groups of individual light waveguide cores, said sleeve having a housing with a pair of cable entrances for receiving light waveguide cables whose cores are spliced together in said housing, each cable entrance having means for sealing the cable in the entrance, said housing containing a plurality of the removable plates with a single plate for each group of individual light waveguide cores of the light waveguide cable, means for arranging and releasably holding the plates in said housing in a spaced relationship, each of said plates containing means for holding the splices of the light waveguide cores and means for fixing and supporting the excess length of the light waveguide cores being spliced together, said means for fixing and supporting comprises a plurality of guide pins arranged on each of said removable plates for supporting the light waveguide cores in loose loops, and said housing having a comb with a plurality of spaced notches adjacent each cable entrance for receiving the light waveguide groups to space and distribute them to the respective removable plates so that each of the cables with a plurality of waveguide groups enters each entrance with the combs separating and distributing the groups to individual plates which separate and hold each of the spliced cores of the respective group.

2. A sleeve according to claim 1, wherein said means for sealing comprises a pressed plug seal.

3. A sleeve according to claim 1, wherein said means for sealing comprises a shrinkable sealing tube.

4. A sleeve according to claim 1, wherein the means for holding the splices comprises a plurality of holding elements disposed on each of said plates.

* * * * *